(12) United States Patent
Gasc et al.

(10) Patent No.: US 11,766,897 B2
(45) Date of Patent: Sep. 26, 2023

(54) TREAD FOR AN AGRICULTURAL VEHICLE TIRE

(71) Applicant: COMPAGNIE GENERALE DES ETABLISSEMENTS MICHELIN, Clermont-Ferrand (FR)

(72) Inventors: Alexandre Gasc, Clermont-Ferrand (FR); Vincent Pery, Clemont-Ferrand (FR); Olivier Ropars, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 344 days.

(21) Appl. No.: 16/628,571

(22) PCT Filed: Jul. 2, 2018

(86) PCT No.: PCT/FR2018/051632
§ 371 (c)(1),
(2) Date: Jan. 3, 2020

(87) PCT Pub. No.: WO2019/008257
PCT Pub. Date: Jan. 10, 2019

(65) Prior Publication Data
US 2020/0156414 A1    May 21, 2020

(30) Foreign Application Priority Data
Jul. 4, 2017  (FR) ...................................... 1756282

(51) Int. Cl.
*B60C 11/03*        (2006.01)

(52) U.S. Cl.
CPC ....... *B60C 11/0306* (2013.01); *B60C 11/0311* (2013.01); *B60C 11/0302* (2013.01);
(Continued)

(58) Field of Classification Search
CPC ............ B60C 2200/08; B60C 2200/14; B60C 2200/06; B60C 2200/065; B60C 11/0316; B60C 11/0311
See application file for complete search history.

(56) References Cited

U.S. PATENT DOCUMENTS

| | | |
|---|---|---|
| 3,603,370 A | 9/1971 | Hylbert |
| 4,131,148 A | 12/1978 | Bertazzoli |

(Continued)

FOREIGN PATENT DOCUMENTS

| | | |
|---|---|---|
| DE | 888 654 | 9/1953 |
| EP | 795 427 | 9/1997 |

(Continued)

*Primary Examiner* — Cedrick S Williams
(74) *Attorney, Agent, or Firm* — Cozen O'Connor (57) ABSTRACT

Tread of a tire for an agricultural vehicle having each lug (3) extending over a radial height H in a radial direction (ZZ') from a bottom surface (5) to a contact face (6), extending over an axial width L in an axial direction (YY') from an axially inner end face (7) to an axially outer end face (8), and extending over a mean thickness E in the circumferential direction (XX') from a trailing face (9) to a leading face (10). The leading face (10) of each lug (3) comprises a discontinuity (11) that extends circumferentially in the direction of the trailing face (9), axially inwards from the axially outer end face (8) and radially inwards from the contact face (6). The discontinuity (11) on the leading face (10) of each lug (3) is continued by a recess (12) formed in the bottom surface (5).

17 Claims, 4 Drawing Sheets

(52) U.S. Cl.
CPC ............... *B60C 2011/0365* (2013.01); *B60C 2011/0367* (2013.01); *B60C 2200/08* (2013.01)

(56) References Cited

U.S. PATENT DOCUMENTS

| | | | |
|---|---|---|---|
| 4,383,567 A | 5/1983 | Crum | |
| 4,446,902 A | 5/1984 | Madec | |
| 4,611,647 A * | 9/1986 | Rimondi | B60C 11/0316 |
| | | | 152/209.12 |
| 5,010,935 A | 4/1991 | Bonko | |
| 6,209,602 B1 | 4/2001 | Bonko | |
| 6,260,594 B1 | 7/2001 | Bonko | |
| 2008/0041509 A1* | 2/2008 | Shimizu | B60C 11/0311 |
| | | | 152/209.16 |
| 2016/0068025 A1* | 3/2016 | Kodama | B60C 11/0316 |
| | | | 152/209.12 |
| 2017/0217253 A1* | 8/2017 | Vervaet | B60C 11/005 |

FOREIGN PATENT DOCUMENTS

| | | | |
|---|---|---|---|
| EP | 903 249 | | 3/1999 |
| EP | 1 831 034 | | 9/2007 |
| EP | 2 714 431 | | 4/2014 |
| IN | 201611004823 A | * | 8/2017 |
| JP | H01 122306 | | 8/1989 |
| JP | 02204107 A | * | 8/1990 |
| JP | 08034209 A | * | 2/1996 |
| JP | 1115417 | | 4/1999 |
| JP | 2014 234084 | | 12/2014 |
| WO | WO 98/08697 | | 3/1998 |

\* cited by examiner

TREAD FOR AN AGRICULTURAL VEHICLE TIRE

RELATED APPLICATIONS

This is a U.S. National Phase Application under 35 USC 371 of International Application PCT/FR2018/051632 filed on Jul. 2, 2018.

This application claims the priority of French application no. 1756282 filed Jul. 4, 2017, the entire content of which is hereby incorporated by reference.

FIELD OF THE INVENTION

The present invention relates to a tire for an agricultural vehicle, such as an agricultural tractor or an agri-industrial vehicle, and relates more particularly to the tread of such a tire.

BACKGROUND OF THE INVENTION

In the following text, the circumferential, axial and radial directions refer to a direction tangential to the tread surface and oriented in the direction of rotation of the tire, to a direction parallel to the axis of rotation of the tire, and to a direction perpendicular to the axis of rotation of the tire, respectively.

A tire for an agricultural vehicle is intended to run over various types of ground such as the more or less compact soil of the fields, unmade tracks providing access to the fields, and the tarmacked surfaces of roads. Bearing in mind the diversity of use, in the field and on the road, a tire for an agricultural vehicle, and in particular the tread thereof, needs to offer a performance compromise between traction in the field, resistance to chunking, resistance to wear on the road, resistance to forward travel, and vibrational comfort on the road, this list not being exhaustive.

In order to satisfy all of these performance requirements, the tread of a tire for an agricultural vehicle generally comprises a plurality of lugs, raised elements extending radially from a bottom surface to the tread surface.

A lug generally has an elongate parallelepipedal overall shape made up of at least one rectilinear or curvilinear portion, and is separated from the adjacent lugs by grooves. A lug may be made up of a succession of rectilinear portions, as described in the documents U.S. Pat. Nos. 3,603,370, 4,383,567, EP795427 or may have a curvilinear shape, as set out in the documents U.S. Pat. No. 4,446,902, EP903249, EP1831034.

In the radial direction, a lug extends outwards from the bottom surface to the tread surface. The radially outer face of the lug, which belongs to the tread surface and is intended to come into contact with the ground as the lug enters the contact patch in which the tire is in contact with the ground, is known as the contact face of the lug. The radially inner lug portion in the vicinity of the bottom surface is known as the lug base. The radial distance between the bottom surface and the tread surface defines the lug height.

In the axial direction, a lug extends inwards from an axially outer end face to an axially inner end face. The axially outer end face delimits, axially on the outside, a lug wing, an axially outer lug portion, which is positioned at the shoulder or edge of the tread. The axially inner end face delimits, axially on the inside, the lug nose, an axially inner lug portion, which is usually positioned at the middle of the tread. The axial distance between the axially outer end face and the axially inner end face defines the lug width.

In the circumferential direction, a lug extends, in a preferred direction of rotation of the tire, between a leading face and a trailing face. A preferred direction of rotation means the direction of rotation recommended by the manufacturer of the tire for optimum use of the tire. By way of example, in the case of a tread comprising two rows of lugs configured in a V or in chevrons, the tire has a preferred direction of rotation according to the point of the chevrons. The leading face is, by definition, the face of which the radially outer edge corner or leading edge corner is first to come into contact with the ground when the lug enters the contact patch in which the tire is in contact with the ground, as the tire rotates. The trailing face is, by definition, the face of which the radially outer edge corner or trailing edge corner is last to come into contact with the ground when the lug enters the contact patch in which the tire is in contact with the ground, as the tire rotates. In the direction of rotation, the leading face is said to be forward of the trailing face. The mean distance between the leading face and the trailing face defines the mean lug thickness.

A lug usually has a mean angle of inclination, with respect to the circumferential direction, of around 45°, the mean angle of inclination being the gradient of the straight line passing through the axial ends of the lug. More specifically and by convention, the straight line defining the mean angle of inclination of the lug passes through an axially inner end point of the trailing face and through an axially outer end point of the trailing face. This mean angle of inclination allows in particular a compromise between traction in the field and vibrational comfort. Traction in the field is better if the lug is more radial, that is to say if its mean angle of inclination is close to 90°, whereas vibrational comfort is better if the lug is more longitudinal, that is to say if its mean angle of inclination is close to 0°. It is a well-known fact that traction in the field is more greatly determined by the angle of the lug in the shoulder region, and this has led certain tire designers to offer a very curved lug shape, resulting in a lug that is substantially radial at the shoulder and substantially longitudinal at the middle of the tread.

The tread of a tire for an agricultural vehicle usually comprises two rows of lugs as described above. This distribution of lugs that are inclined with respect to the circumferential direction gives the tread a V shape commonly referred to as a chevron pattern. The two rows of lugs exhibit symmetry with respect to the equatorial plane of the tire, usually with a circumferential offset between the two rows of lugs, resulting from one half of the tread being rotated about the axis of the tire with respect to the other half of the tread. Moreover, the lugs may be continuous or discontinuous and may be distributed circumferentially with a spacing that is constant or variable.

Various designs of lugged treads have been proposed, depending on the desired performance improvement, as shown for example by the documents cited below. The document U.S. Pat. No. 4,131,148 presents a faceted bottom surface for improving traction in the field and self-cleaning of the tread. The document U.S. Pat. No. 4,611,647 proposes a lug having a leading face of which the circumferential profile, along a circumferential plane, parallel to the equatorial plane, is convex and curvilinear, in order to improve wear resistance, traction efficiency and lifetime. The document U.S. Pat. No. 5,010,935 describes a lug of which the leading face has a concave circumferential profile with two inclinations, for better traction in the field and better resistance to chunking. The document JP11115417 describes a lug of which the leading face has a convex circumferential profile with two inclinations, in order to improve traction in the field and self-cleaning of the tread.

The improvement in traction in the field is therefore a constant concern for designers of tires for agricultural vehicles, as shown by the prior art patent documents cited above.

Moreover, as regards operation in the field, another significant concern for tire designers is the improvement in the resistance of the lugs to attack, and more particularly to attack by residual stubble in the fields after harvesting. Stubble consists of plant stem portions, the free end of which is generally sharp. The sharp free end of a piece of stubble that comes into contact with the leading face of a lug is able to locally and superficially pierce the latter, causing local chunking of the constituent elastomeric material of the lug. Repeated attacks on the leading faces of the lugs by stubble can cause significant deterioration of the appearance of the lugs, or even chunking notably in the vicinity of the axially inner or outer ends of the lugs, that is to say at the lug noses or wings. This deterioration is a potential cause for complaint on the part of users, and may make it necessary to replace the tire.

The document EP 2714431 B1 describes the tread of a tire for an agricultural vehicle with a reduced risk of attack on the leading faces of the axially outer ends of the lugs by residual stubble after harvesting, and thus of chunking. This aim was achieved by virtue of an optimized leading face profile, characterized in that the angle of the straight line tangent to the leading profile at a point of the leading profile, with respect to the equatorial plane of the tire, increases continuously from an axially outermost point of the leading profile, when the axial distance between the point of the leading profile and the axially outermost point of the leading profile increases, in that the angle reaches a maximum value at an inflection point of the leading profile, and in that the radius of curvature at any point of the leading profile, positioned axially between the axially outermost point and the inflection point, is at least equal to 0.4 times the lug height.

SUMMARY OF THE INVENTION

One object of the present invention is to further reduce, for a tread of a tire for an agricultural vehicle, the risk of attack on the leading faces of the wings of lugs by residual stubble after harvesting while maintaining good traction in the field.

This and other objects have been achieved according to one aspect of the invention directed to a tire for an agricultural vehicle, comprising:

a tread comprising two rows of lugs that are separated from one another by grooves, two consecutive lugs in one and the same row being spaced apart, in a circumferential direction, by a circumferential distance P, each lug extending over a radial height H in a radial direction from a bottom surface to a contact face, extending over an axial width L in an axial direction from an axially inner end face to an axially outer end face, and extending over a mean thickness E in the circumferential direction from a trailing face to a leading face, each lug having a mean direction that passes through an axially inner end point of the trailing face and through an axially outer end point of the trailing face and forms a mean angle A with the circumferential direction, the leading face of each lug comprising a discontinuity that extends circumferentially in the direction of the trailing face, axially inwards from the axially outer end face and radially inwards from the contact face, and the discontinuity on the leading face of each lug being continued by a recess formed in the bottom surface.

Thus, each lug of the tread of a tire for an agricultural vehicle according to an embodiment of the invention comprises, at its leading face and in its axially outer end portion or wing, a discontinuity for evacuating residual stubble out of the tread.

This optimization of the local geometry of the lug makes it possible to preserve the geometric features of the rest of the lug and therefore as a whole to maintain the performance in terms of traction in the field, resistance to wear and resistance to chunking. In other words, the function of evacuating residual stubble is dissociated from the other functions of the tread.

The discontinuity on the leading face also makes it possible to increase, if necessary, the angle formed by the leading face with the radial direction, this being favourable to the evacuation of stubble at the lug wing.

According to an embodiment of the invention, the discontinuity on the leading face of each lug is continued by a recess formed in the bottom surface.

The combination of a discontinuity on the leading face and a recess, formed in the bottom surface and positioned at the lug base, makes it possible to obtain a conical surface based on the leading face and the bottom surface, further improving the capacity to evacuate stubble at the lug wing. Moreover, this evacuation cone is favourable to traction in the field and to the evacuation of earth.

Advantageously, the discontinuity on the leading face of each lug extends circumferentially in the direction of the trailing face over a circumferential distance $X_{11}$ at least equal to 0.05 times the mean thickness E of the lug and at most equal to 0.35 times the mean thickness E of the lug.

The circumferential distance $X_{11}$ of the discontinuity on the leading face is measured in the circumferential direction of the tire, while the mean thickness E of the lug is the maximum distance measured between the leading face and the trailing face.

Below 0.05 times the mean thickness E of the lug, the circumferential distance $X_{11}$ of the discontinuity on the leading face is insufficient to ensure the evacuation of residual stubble. Above 0.35 times the mean thickness E of the lug, the circumferential distance $X_{11}$ of the discontinuity on the leading face has a negative effect on the other performance aspects of the lug, such as traction in the field, resistance to wear and resistance to chunking. Moreover, the range of values of the circumferential distance $X_{11}$ of the discontinuity on the leading face makes it possible to locally increase, at the discontinuity on the leading face, the angle formed by the leading face with the radial direction, and the connecting radius between the leading face and the bottom surface, this being favourable to the evacuation of stubble at the lug wing.

Also advantageously, the discontinuity on the leading face of each lug extends axially inwards from the axially outer end face over an axial distance $Y_{11}$ at least equal to 0.1 times the axial width L of the lug and at most equal to 0.3 times the axial width L of the lug.

This range of the axial distance $Y_{11}$ of the discontinuity on the leading face defines the axial width of the lug portion to be protected specifically from attack by residual stubble.

Also advantageously, the discontinuity on the leading face of each lug extends radially inwards from the contact face over a radial distance $Z_{11}$ at least equal to the radial height H of the lug and at most equal to 1.3 times the radial height H of the lug.

The inventors consider this range of the radial distance $Z_{11}$ of the discontinuity on the leading face to be optimal with regard to a bottom surface geometry, and effective as regards the evacuation of stubble while avoiding the addition of superfluous material.

Preferably, with the discontinuity on the leading face having a mean direction that passes through an axially inner end point of the discontinuity on the leading face and through an axially outer end point of the discontinuity on the leading face and forms a mean angle $A_{11}$ with the circumferential direction, the difference between the mean angle A of the lug and the mean angle $A_{11}$ of the discontinuity on the leading face is at least equal to 0° and at most equal to 10°, preferably at most equal to 8°.

In other words, the mean angle $A_{11}$ is at most equal to the mean angle A and differs therefrom by an angle at most equal to 10°, preferably at most equal to 8°. A difference between the mean angle A of the lug and the mean angle $A_{11}$ of the discontinuity on the leading face of less than 0° is unfavourable to the evacuation of stubble at the lug wing.

According to a preferred embodiment, the discontinuity on the leading face of each lug comprises a first discontinuity face that extends axially outwards from the leading face to a second discontinuity face.

The presence of a first discontinuity face linked to a second discontinuity face makes it possible to define a transition between the main section of the lug and the lug wing, making it possible to preserve the overall geometric features of the lug, in particular the thickness thereof, over the greatest possible axial distance, starting from the lug nose, without negatively affecting the performance in terms of resistance to wear and resistance to chunking.

According to a variant of this preferred embodiment, with the first discontinuity face of the leading face forming an angle $A_{111}$ with the mean direction of the lug, the angle $A_{111}$ is at least equal to 20° and at most equal to 40°.

Advantageously, the recess formed in the bottom surface extends circumferentially from the discontinuity over a circumferential distance $X_{12}$ at least equal to 0.2 times the mean circumferential distance P between two consecutive lugs and at most equal to the mean circumferential distance P between two consecutive lugs.

The inventors consider this range of the circumferential distance $X_{12}$ of the recess formed in the bottom surface to be optimal with regard to a bottom surface geometry, and effective as regards the evacuation of stubble without negatively affecting the resistance to wear and the resistance to chunking. Moreover, this recess geometry is favourable to traction in the field and to the evacuation of earth.

Also advantageously, with the discontinuity on the leading face of each lug extending axially inwards from the axially outer end face over an axial distance $Y_{11}$, the recess formed in the bottom surface extends axially inwards from the axially outer end face over an axial distance $Y_{12}$ equal to the axial distance $Y_{11}$ over which the discontinuity on the leading face of the lug extends axially.

In other words, in the axial direction, the recess formed in the bottom surface is inscribed in the continuation of the discontinuity on the leading face, this identical axial width for the recess and the discontinuity defining an axial width of the lug portion to be protected specifically from attack by residual stubble.

Also advantageously, the recess formed in the bottom surface extends radially inwards from the bottom surface over a radial distance $Z_{12}$ at least equal to 0.03 times the radial height H of the lug and at most equal to 0.35 times the radial height H of the lug.

Usually, the recess formed in the bottom surface therefore extends radially inwards from the bottom surface over a variable radial distance $Z_{12}$, at least equal to 0.03 times and at most equal to 0.35 times the radial height H of the lug. This contributes towards the effectiveness of the evacuation of stubble and, if appropriate, to traction in the field and the evacuation of earth.

Preferably, the radial distance $Z_{12}$ increases when the circumferential distance $X_{12}$ increases.

In other words, the depth of the recess increases with distance from the leading face of the lug. This change in the depth of the recess makes it possible to create a conical surface that makes it easier to eject stubble and evacuate earth.

According to another preferred embodiment, the trailing face of each lug comprises a discontinuity that extends circumferentially in the direction of the leading face of the closest consecutive lug, axially inwards from the axially outer end face and radially inwards from the contact face at most as far as the bottom surface.

This discontinuity on the trailing face forms a protuberance, which provides a volumetric increase in material, making it possible to compensate for the reduction in the lug volume resulting from the discontinuity on the leading face.

Advantageously, the discontinuity on the trailing face of each lug extends circumferentially in the direction of the leading face of the consecutive lug over a circumferential distance $X_{13}$ at least equal to 0.05 times the mean thickness E of the lug and at most equal to 0.5 times the mean thickness E of the lug.

Also advantageously, with the discontinuity on the leading face of each lug extending axially inwards from the axially outer end face over an axial distance $Y_{11}$, the discontinuity on the trailing face of each lug extends axially inwards from the axially outer end face over an axial distance $Y_{13}$ at least equal to the axial distance $Y_{11}$ over which the discontinuity on the leading face of the lug extends axially.

Also advantageously, the discontinuity on the trailing face of each lug extends radially inwards from the contact face to the bottom surface over a radial distance $Z_{13}$ equal to the radial height H of the lug.

The above-described geometric features of the discontinuity on the trailing face therefore make it possible to preserve a mean thickness of the lug wing that is substantially equal to the mean thickness of the lug in the main section, and, consequently, stiffness features of the lug that are substantially constant over the entire axial width of the lug. This makes it possible to maintain a good level of resistance to wear and resistance to chunking and fatigue compared with a normal lug with a mean thickness that is substantially constant over its entire axial width.

Preferably, the tread is made up of a first and a second row of lugs disposed in chevrons with respect to the equatorial plane of the tire. This chevron embodiment of the tread is usual for a tread of a tire for an agricultural vehicle.

Also preferably, the mean angle A of each lug is at least equal to 20° and at most equal to 70°, preferably at least equal to 30° and at most equal to 60°.

BRIEF DESCRIPTION OF THE DRAWINGS

The present invention will be understood better with the aid of FIGS. 1 to 4 described below.

DETAILED DESCRIPTION OF THE DRAWINGS

Figure 1:
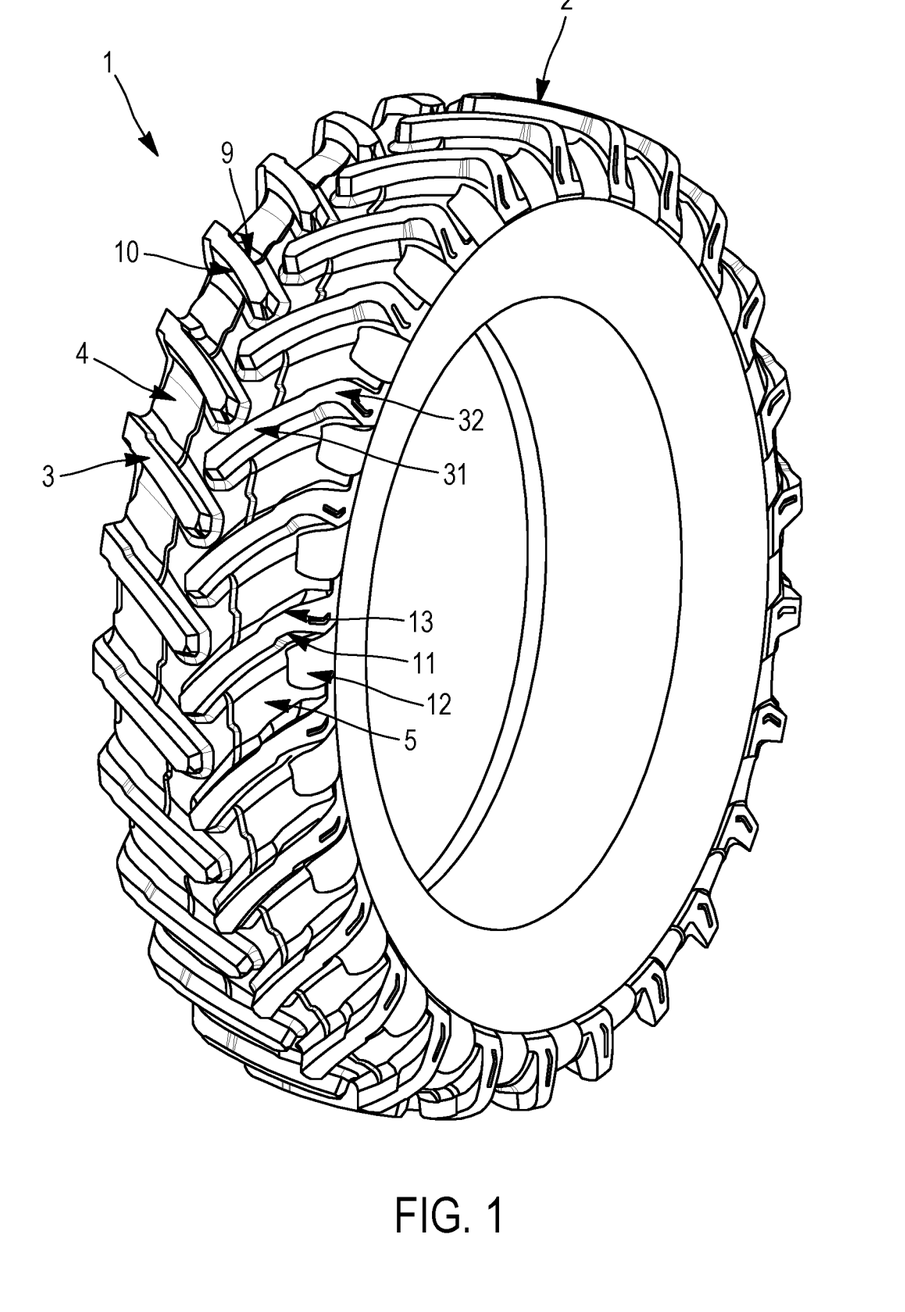
FIG. 1 shows a perspective view of a tire for an agricultural vehicle according to a preferred embodiment of the invention.

FIG. 1 is a perspective view of a tire 1 for an agricultural vehicle, according to a preferred embodiment of the invention. The tread 2 of the tire is made up of lugs 3 that are separated from one another by grooves 4. In the present case, the tread 2 is made up of a first and a second row of lugs 3 disposed in chevrons with respect to the equatorial plane of the tire. The axially outer end portions or wings 32 of lugs are offset circumferentially with respect to the main sections 31 of lugs, which are axially on the inside, on account of the presence of a discontinuity 11 on the leading face 10 and a discontinuity 13 on the trailing face 9. Moreover, the bottom surface 5 comprises a recess 12 at the base of each lug wing 32.

Figure 2:
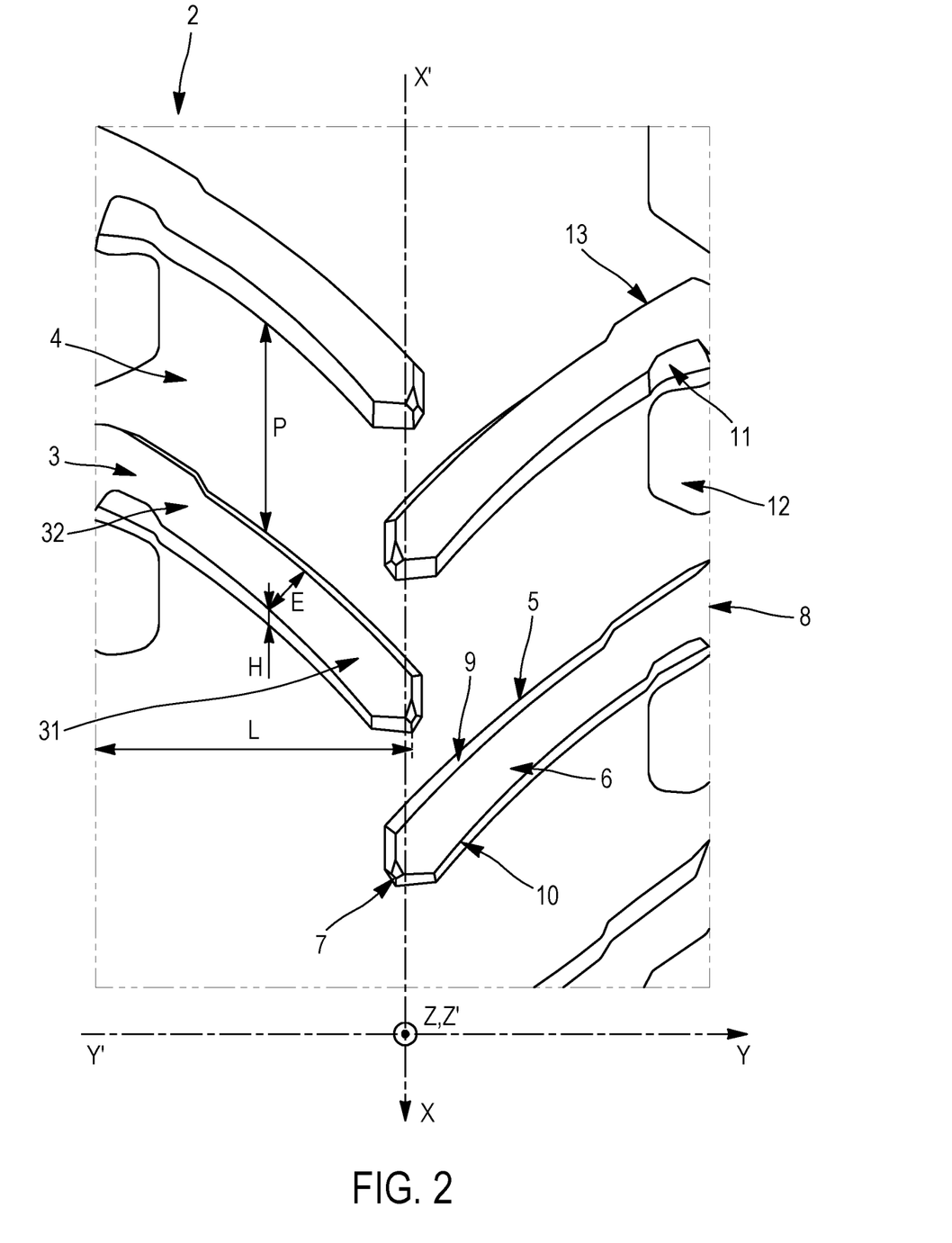
FIG. 2 shows a top view of a tread portion of a tire for an agricultural vehicle according to a preferred embodiment of the invention.

FIG. 2 is a top view of a tread portion 2 of a tire for an agricultural vehicle according to a preferred embodiment of the invention. The tread 2 of the tire is made up of lugs 3 that are separated from one another by grooves 4 and is made up of a first and a second row of lugs 3 disposed in chevrons with respect to the equatorial plane of the tire. Two consecutive lugs 3 in a single row are spaced apart, in a circumferential direction XX', by a circumferential distance P. Each lug 3 comprises an axially inner main section 31 and a lug wing 32, or axially outer end portion of the lug. Each lug 3 extends outwards over a radial height H in a radial direction ZZ' from a bottom surface 5 to a contact face 6, extends outwards over an axial width L in an axial direction YY' from an axially inner end face 7 to an axially outer end face 8, and extends over a mean thickness E in the circumferential direction XX' from a trailing face 9 to a leading face 10. According to the invention, the leading face 10 of each lug 3 comprises a discontinuity 11 that extends circumferentially in the direction of the trailing face 9, axially inwards from the axially outer end face 8 and radially inwards from the contact face 6. Preferably, the discontinuity 11 on the leading face 10 of each lug 3 is continued by a recess 12 formed in the bottom surface 5. Also preferably, the trailing face 9 of each lug 3 comprises a discontinuity 13 that extends circumferentially in the direction of the leading face 10 of the closest consecutive lug 3, axially inwards from the axially outer end face 7 and radially inwards from the contact face 6 at least as far as the bottom surface 5.

Figure 3:
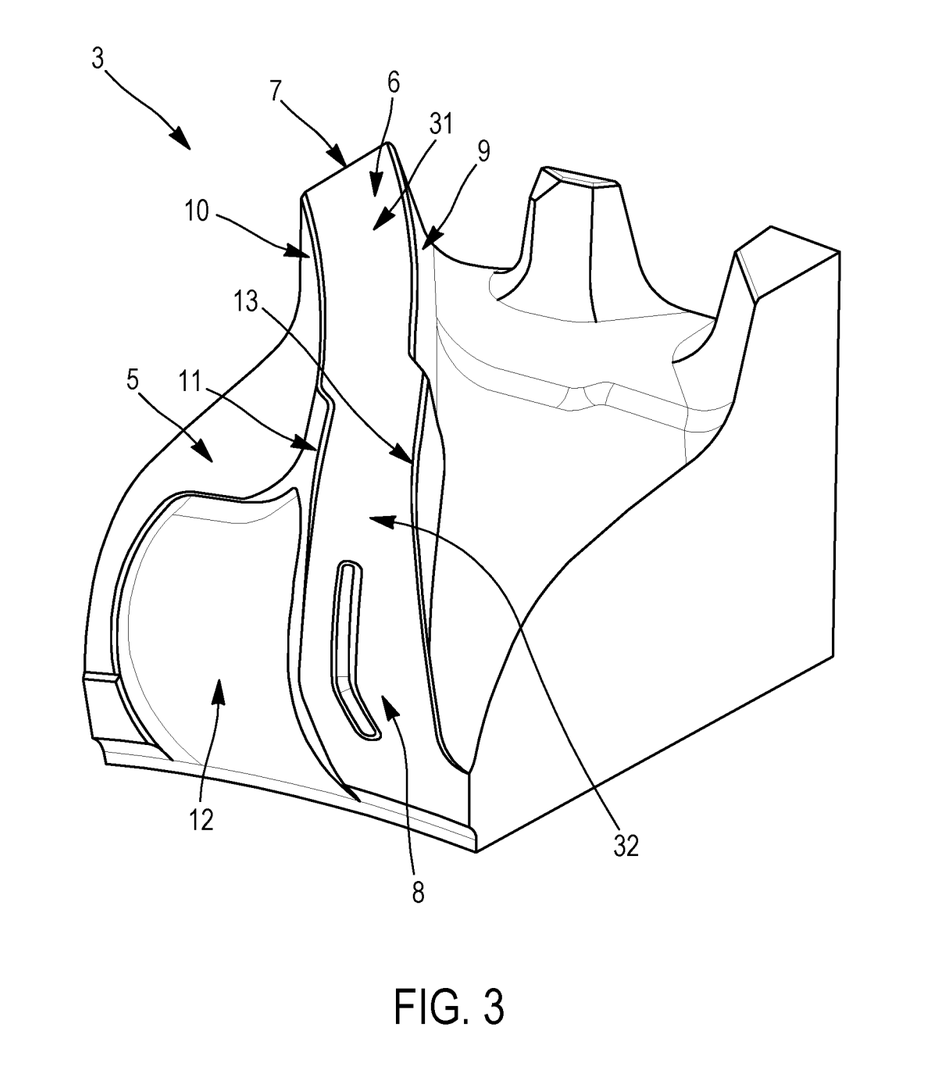
FIG. 3 shows a perspective view of a lug of a tread of a tire for an agricultural vehicle according to a preferred embodiment of the invention.

FIG. 3 is a perspective view of a lug of a tread of a tire for an agricultural vehicle according to a preferred embodiment of the invention. The axially inner end 7 and axially outer end 8 of the lug 3 are shown, as are the trailing face 9, leading face 10, contact face 6 and bottom surface 5. Also shown are the axially inner main section 31 and the lug wing 32 comprising a discontinuity 11 on the leading face 10, a recess 12 in the bottom surface 5 and a discontinuity 13 on the trailing face 9.

Figure 4:
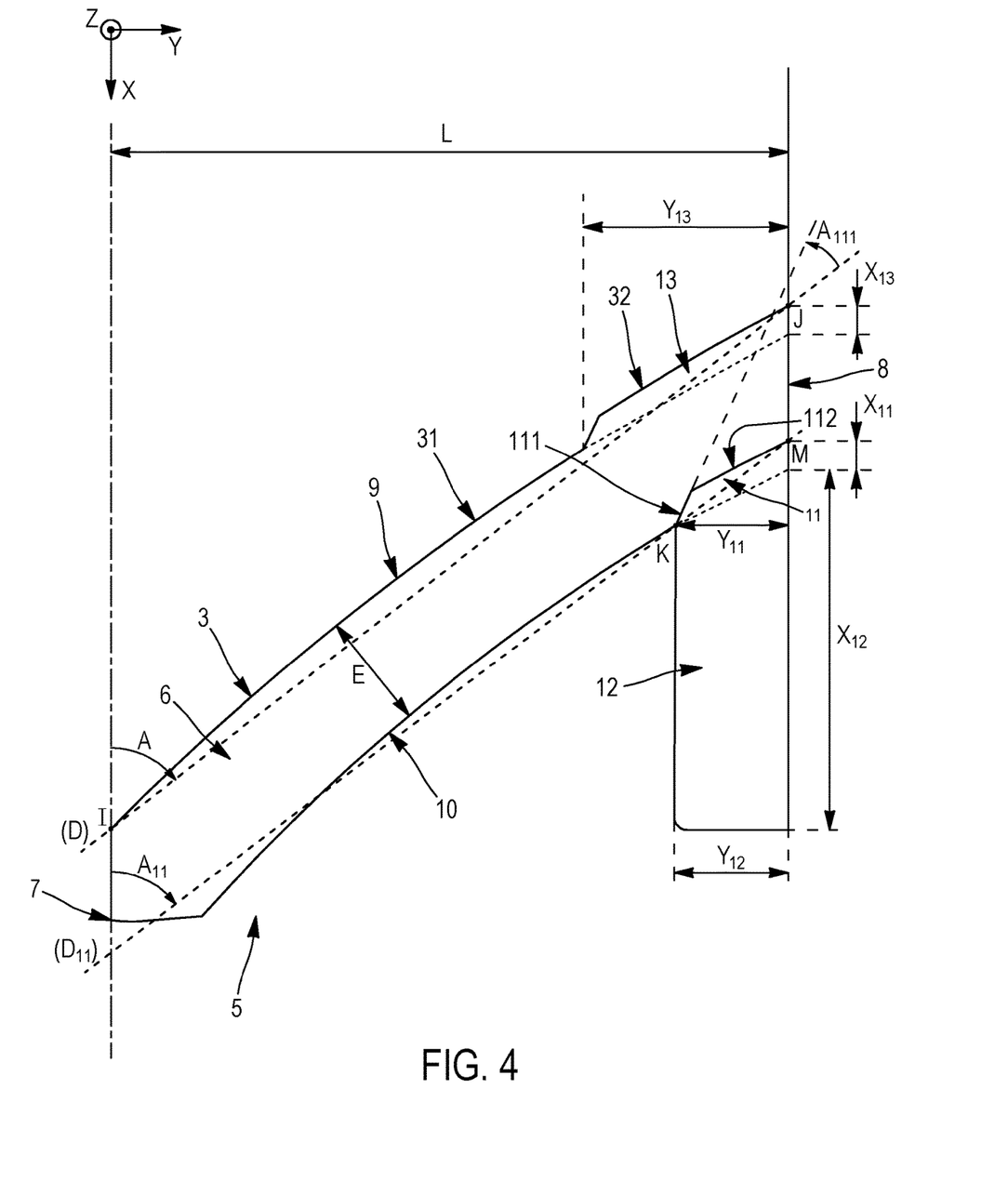
FIG. 4 shows a top view of a lug of a tread of a tire for an agricultural vehicle according to a preferred embodiment of the invention.

FIG. 4 is a top view of a lug 3 of a tread of a tire for an agricultural vehicle according to a preferred embodiment of the invention. As in FIGS. 2 and 3, the axially inner end 7 and axially outer end 8 of the lug 3 are shown, as are the trailing face 9, leading face 10, contact face 6 and bottom surface 5. Also shown are the axially inner main section 31 and the lug wing 32. The lug 3 has a mean thickness E and an axial width L. The lug 3 also has a mean direction D that passes through an axially inner end point I of the trailing face 9 and through an axially outer end point J of the trailing face 9 and forms a mean angle A with the circumferential direction XX'. The discontinuity 11 on the leading face 10 of the lug 3 extends circumferentially in the direction of the trailing face 9 over a circumferential distance $X_{11}$, axially inwards from the axially outer end face 7 over an axial distance $Y_{11}$, and radially inwards from the contact face 6 over a radial distance $Z_{11}$ (not shown). The discontinuity 11 on the leading face 10 has a mean direction $D_{11}$ that passes through an axially inner end point K of the discontinuity 11 on the leading face 10 and through an axially outer end point M of the discontinuity 11 on the leading face 10 and forms a mean angle $A_{11}$ with the circumferential direction XX'. Moreover, the discontinuity 11 on the leading face 10 of the lug 3 comprises a first discontinuity face 111 that extends axially outwards from the leading face 10 to a second discontinuity face 112. Moreover, the discontinuity 11 on the leading face 10 of the lug 3 is continued by a recess 12 formed in the bottom surface 5, said recess 12 extending circumferentially from the discontinuity 10 over a circumferential distance $X_{12}$, axially inwards form the axially outer end face 7 over an axial distance $Y_{12}$ equal to the axial distance $Y_{11}$ over which the discontinuity 11 on the leading face 10 of the lug 3 extends axially, and radially inwards from the bottom surface 5 over a radial distance $Z_{12}$ (not shown) that increases when the circumferential distance $X_{12}$ increases. Finally, the trailing face 9 of the lug 3 comprises a discontinuity 13 that extends circumferentially in the direction of the leading face 10 of the closest consecutive lug 3, axially inwards from the axially outer end face 7 and radially inwards from the contact face 6 to the bottom surface 5. The discontinuity 13 on the trailing face 9 of the lug 3 extends circumferentially in the direction of the leading face 10 of the consecutive lug 3 over a circumferential distance $X_{13}$, axially inwards from the axially outer end face 7 over an axial distance $Y_{13}$, and radially inwards from the contact face 6 to the bottom surface 5 over a radial distance $Z_{13}$ (not shown).

The invention has been implemented more particularly for an agricultural tire of size 380/80R38. Table 1 below presents the technical features of an example of a preferred embodiment of the invention, as shown in FIGS. 1 to 4.

TABLE 1

| Geometric features | Values of the example |
| --- | --- |
| Lug height H | 52 mm |
| Axial lug width L | 174 mm |
| Mean lug thickness E | 33 mm |
| Mean angle A of the lug | 46° |
| Circumferential distance P between two consecutive lugs | 180 mm |
| Circumferential distance $X_{11}$ of the discontinuity 11 on the leading face 10 | 5.4 mm |
| Axial distance $Y_{11}$ of the discontinuity 11 on the leading face 10 | 27 mm |
| Radial distance $Z_{11}$ of the discontinuity 11 on the leading face 10 | 54.8 mm |
| Mean angle $A_{11}$ of the discontinuity | 45° |
| Angle $A_{111}$ of the 1$^{st}$ face 111 of the discontinuity | 21° |

TABLE 1-continued

| Geometric features | Values of the example |
|---|---|
| Circumferential distance $X_{12}$ of the recess 12 | 118 mm |
| Axial distance $Y_{12}$ of the recess 12 | 27 mm |
| Maximum radial distance $Z_{12}$ of the recess 12 | 3 mm |
| Circumferential distance $X_{13}$ of the discontinuity 13 on the trailing face 9 | 7.6 mm |
| Axial distance $Y_{13}$ of the discontinuity 13 on the trailing face 9 | 55.7 mm |
| Radial distance $Z_{13}$ of the discontinuity 13 on the trailing face 9 | 52 mm |

As regards the geometric features of the discontinuity 11 on the leading face 10 of the example, the circumferential distance $X_{11}$ of the discontinuity 11 on the leading face 10 is equal to 0.16 times the mean lug thickness E, the axial distance $Y_{11}$ of the discontinuity 11 on the leading face 10 is equal to 0.15 times the axial lug width L, and the radial distance $Z_{11}$ of the discontinuity 11 on the leading face 10 is equal to 1.05 times the lug height H.

As regards the geometric features of the recess 12 of the example, the circumferential distance $X_{12}$ of the recess 12 is equal to 0.65 times the circumferential distance P between two consecutive lugs, the axial distance $Y_{12}$ of the recess 12 is equal to the axial distance $Y_{11}$ of the discontinuity 11 on the leading face 10, and the radial distance Zit of the recess 12 is equal to 0.06 times the lug height H.

As regards the geometric features of the discontinuity 13 on the trailing face 9 of the example, the circumferential distance $X_{13}$ of the discontinuity 13 on the trailing face 9 is equal to 0.23 times the mean lug thickness E, the axial distance $Y_{13}$ of the discontinuity 13 on the trailing face 9 is equal to 0.32 times the axial lug width L, and therefore greater than the axial distance $Y_{11}$ of the discontinuity 11 on the leading face 10, and the radial distance $Z_{13}$ of the discontinuity 13 on the trailing face 9 is equal to the lug height H.

In internal tests, the inventors compared the performance in terms of traction in the field and resistance to attack by stubble between an agricultural tire according to the invention, as characterized in Table 1 above, and a reference tire with conventional lugs, a conventional lug not having a discontinuity either on its leading face or on its trailing face and not having a recess at the lug base. They were able to demonstrate that a tire according to the invention, as defined in the example in Table 1, makes it possible, compared with a reference tire having conventional lugs, to reduce attacks on the leading faces of the lug wings by residual stubble after harvesting, while maintaining good traction in the field.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A tire for an agricultural vehicle, comprising:
a tread comprising two rows of lugs that are separated from one another by grooves;
two consecutive said lugs in one and the same row being spaced apart, in a circumferential direction, by a circumferential distance P;
each said lug extending over a radial height in a radial direction from a bottom surface to a contact face, extending over an axial width in an axial direction from an axially inner end face to an axially outer end face, and extending over a mean thickness in the circumferential direction from a trailing face to a leading face;
each said lug having a mean direction that passes through an axially inner end point of the trailing face and through an axially outer end point of the trailing face and forms a mean angle with the circumferential direction,
wherein the leading face of each said lug comprises a discontinuity that extends circumferentially in the direction of the trailing face, axially inwards from the axially outer end face and radially inwards from the contact face,
wherein the discontinuity on the leading face of each said lug is continued by a recess formed in the bottom surface extending circumferentially from the discontinuity over a circumferential distance, axially inwards from the axially outer end face over an axial distance equal to the axial distance over which the discontinuity on the leading face of the lug axially extends, and radially inwards from the bottom surface over a radial distance,
wherein the tread is comprised of a first and a second row of said lugs disposed in chevrons with respect to the equatorial plane of the tire,
wherein the first and the second rows of the lugs partially circumferentially overlap at their respective axially inner end points,
wherein the mean angle of said each lug is at least equal to 20° and at most equal to 70°, and
wherein the trailing face of each said lug comprises a trailing discontinuity protrusion that extends circumferentially in the direction of the leading face of the closest consecutive said lug, axially inwards from the axially outer end face and radially inwards from the contact face at most as far as the bottom surface,
wherein the trailing discontinuity on the trailing face of each said lug extends axially inwards over an axial distance at least equal to the axial distance over which the discontinuity on the leading face of the lug extends axially.

2. The tire according to claim 1, wherein the discontinuity on the leading face of each said lug extends circumferentially in the direction of the trailing face over a circumferential distance at least equal to 0.05 times the mean thickness of the lug and at most equal to 0.35 times the mean thickness of the lug.

3. The tire according to claim 1, wherein the discontinuity on the leading face of each said lug extends axially inwards from the axially outer end face over an axial distance at least equal to 0.1 times the axial width of the lug and at most equal to 0.3 times the axial width of the lug.

4. The tire according to claim 1, wherein the discontinuity on the leading face of each said lug extends radially inwards from the contact face over a radial distance at least equal to the radial height of the lug and at most equal to 1.3 times the radial height of the lug.

5. The tire according to claim 1, the discontinuity on the leading face having a mean direction that passes through an axially inner end point of the discontinuity on the leading face and through the axially outer end point of the discontinuity on the leading face and forms a mean angle with the circumferential direction, wherein the difference between the mean angle of the lug and the mean angle of the discontinuity on the leading face is at least equal to 0° and at most equal to 10°.

6. The tire according to claim 1, the discontinuity on the leading face of each said lug extending axially inwards from the axially outer end face over an axial distance, wherein the recess formed in the bottom surface extends axially inwards from the axially outer end face over the axial distance equal to the axial distance $Y_{11}$ over which the discontinuity on the leading face of the lug extends axially.

7. The tire according to claim 1, wherein the trailing discontinuity on the trailing face of each said lug extends circumferentially in the direction of the leading face of the consecutive said lug over a circumferential distance at least equal to 0.05 times the mean thickness of the lug and at most equal to 0.5 times the mean thickness of the lug.

8. The tire according to claim 1, the discontinuity on the leading face of each said lug extending axially inwards from the axially outer end face over an axial distance.

9. The tire according to claim 1, wherein the trailing discontinuity on the trailing face of each said lug extends radially inwards from the contact face to the bottom surface over a radial distance equal to the radial height of the lug.

10. The tire according to claim 1, the discontinuity on the leading face having a mean direction that passes through an axially inner end point of the discontinuity on the leading face and through the axially outer end point of the discontinuity on the leading face and forms a mean angle with the circumferential direction, wherein the difference between the mean angle of the lug and the mean angle of the discontinuity on the leading face is at least equal to 0° and at most equal to 8°.

11. The tire according to claim 1, wherein the mean angle of each said lug is at least equal to 30° and at most equal to 60°.

12. The tire according to claim 1, wherein the recess formed in the bottom surface extends radially inwards from the bottom surface over the radial distance at least equal to 0.03 times the radial height of the lug and at most equal to 0.35 times the radial height of the lug.

13. The tire according to claim 1, wherein the discontinuity on the leading face of each said lug comprises a first discontinuity face that extends axially outwards from the leading face to a second discontinuity face.

14. The tire according to claim 13, the first discontinuity face of the leading face forming an angle with the mean direction of the lug, wherein the angle is at least equal to 20° and at most equal to 40°.

15. The tire according to claim 1, wherein the recess formed in the bottom surface extends circumferentially from the discontinuity over the circumferential distance at least equal to 0.2 times the mean circumferential distance between two consecutive said lugs and at most equal to the mean circumferential distance between two consecutive lugs.

16. The tire according to claim 15, wherein the recess formed in the bottom surface extends radially inwards from the bottom surface over the radial distance at least equal to 0.03 times the radial height of the lug and at most equal to 0.35 times the radial height of the lug.

17. The tire according to claim 16, wherein the radial distance increases when the circumferential distance increases.

* * * * *